United States Patent
Martin et al.

(10) Patent No.: US 10,434,545 B2
(45) Date of Patent: Oct. 8, 2019

(54) PARTICLE SEPARATOR FOR AN ADDITIVE MANUFACTURING SYSTEM AND METHOD OF OPERATION

(71) Applicant: United Technologies Corporation, Farmington, CT (US)

(72) Inventors: Thomas J. Martin, East Hampton, CT (US); Alexander Staroselsky, Avon, CT (US); Sergey Mironets, Charlotte, NC (US); Thomas N. Slavens, Moodus, CT (US); Brooks E. Snyder, Dartmouth (CA)

(73) Assignee: United Technologies Corporation, Farmington, CT (US)

( * ) Notice: Subject to any disclaimer, the term of this patent is extended or adjusted under 35 U.S.C. 154(b) by 548 days.

(21) Appl. No.: 15/109,020

(22) PCT Filed: Jan. 15, 2015

(86) PCT No.: PCT/US2015/011597
§ 371 (c)(1),
(2) Date: Jun. 29, 2016

(87) PCT Pub. No.: WO2015/109091
PCT Pub. Date: Jul. 23, 2015

(65) Prior Publication Data
US 2016/0318072 A1 Nov. 3, 2016

Related U.S. Application Data

(60) Provisional application No. 61/928,825, filed on Jan. 17, 2014.

(51) Int. Cl.
*B07B 7/08* (2006.01)
*B07B 7/083* (2006.01)
(Continued)

(52) U.S. Cl.
CPC ............... *B07B 7/08* (2013.01); *B07B 4/025* (2013.01); *B07B 7/083* (2013.01); *B07B 13/04* (2013.01);
(Continued)

(58) Field of Classification Search
CPC .......... B07B 7/08; B07B 7/083; B07B 4/025; B07B 13/04; B33Y 40/00; B33Y 10/00; B33Y 30/00
(Continued)

(56) References Cited

U.S. PATENT DOCUMENTS 3,986,949 A * 10/1976 Di Duca ............... B07B 7/01
209/35
4,132,634 A 1/1979 Rumpf et al.
(Continued)

FOREIGN PATENT DOCUMENTS

WO 2008146698 12/2008
WO WO-2008146698 A1 * 12/2008 ............ B22F 3/1055

OTHER PUBLICATIONS

EP search report for EP14737134.5 dated Jan. 2, 2017.

*Primary Examiner* — Terrell H Matthews
(74) *Attorney, Agent, or Firm* — O'Shea Getz P.C.

(57) ABSTRACT

A aerodynamic particle separator for an Additive Manufacturing System (AMS) has an air supply device to entrain a mixed powder in an airstream flowing through a housing. Each particle in the mixed powder is imparted with a momentum dependent upon the particle weight and size. Utilizing this momentum characteristic, the heavier particles are capable of crossing streamlines of the airstream at a bend portion of the housing and the lighter particles generally stay within the streamlines. Utilizing this dynamic characteristic,
(Continued)

the particles of specific weight ranges are collected through respective offtake holes in the housing and controllably fed to a spreader of the AMS.

19 Claims, 3 Drawing Sheets

(51) Int. Cl.
| | |
|---|---|
| B07B 13/04 | (2006.01) |
| B22F 3/105 | (2006.01) |
| B33Y 40/00 | (2015.01) |
| B23K 26/342 | (2014.01) |
| B23K 15/00 | (2006.01) |
| B07B 4/02 | (2006.01) |
| B29C 64/153 | (2017.01) |
| B29C 64/20 | (2017.01) |
| B29C 64/35 | (2017.01) |
| B33Y 10/00 | (2015.01) |
| B33Y 30/00 | (2015.01) |
| B29K 105/00 | (2006.01) |

(52) U.S. Cl.
CPC ........ B22F 3/1055 (2013.01); B23K 15/0086 (2013.01); B23K 26/342 (2015.10); B29C 64/153 (2017.08); B29C 64/20 (2017.08); B29C 64/35 (2017.08); B33Y 40/00 (2014.12); B22F 2003/1056 (2013.01); B22F 2003/1059 (2013.01); B29K 2105/251 (2013.01); B33Y 10/00 (2014.12); B33Y 30/00 (2014.12); Y02P 10/295 (2015.11)

(58) Field of Classification Search
USPC .......................................................... 209/644
See application file for complete search history.

(56) References Cited

U.S. PATENT DOCUMENTS

| | | | | |
|---|---|---|---|---|
| 4,159,942 | A | | 7/1979 | Greer et al. |
| 5,205,415 | A | * | 4/1993 | Surtees .................... A24B 5/10 |
| | | | | 131/312 |
| 5,354,414 | A | * | 10/1994 | Feygin ..................... B22C 9/00 |
| | | | | 216/34 |
| 5,817,206 | A | * | 10/1998 | McAlea ................... C08J 3/122 |
| | | | | 156/272.8 |
| 2008/0152910 | A1 | | 6/2008 | Hesse et al. |
| 2010/0175853 | A1 | | 7/2010 | Ebert et al. |
| 2011/0033631 | A1 | | 2/2011 | Malshe et al. |

\* cited by examiner

PARTICLE SEPARATOR FOR AN ADDITIVE MANUFACTURING SYSTEM AND METHOD OF OPERATION

This application claims priority to PCT Patent Application No. PCT/US15/011597 filed Jan. 15, 2015 which claims priority to U.S. Patent Application No. 61/928,825 filed Jan. 17, 2014, which are hereby incorporated herein by reference in their entireties.

BACKGROUND

The present disclosure relates to an additive manufacturing system and, more particularly, to a particle separator of the additive manufacturing system and method of operation.

Traditional additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the work product, layer-by-layer. The principle behind additive manufacturing processes involves the selective melting of atomized precursor powder beds by a directed energy source, producing the lithographic build-up of the work product. The melting of the powder occurs in a small localized region of the energy beam, producing small volumes of melting, called melt pools, followed by rapid solidification, allowing for very precise control of the solidification process in the layer-by-layer fabrication of the work product. These devices are directed by three-dimensional geometry solid models developed in Computer Aided Design (CAD) software systems.

The EBM system utilizes an electron beam gun and the DMLS, SLM, and LBM systems utilize a laser as the energy source. Both system beam types are focused by a lens, then deflected by an electromagnetic scanner or rotating mirror so that the energy beam selectively impinges on a powder bed. The EBM system uses a beam of electrons accelerated by an electric potential difference and focused using electromagnetic lenses that selectively scans the powder bed. The DMLS, SLM and LBM utilize a focused laser beam scanned by a rotating mirror. The EBM technology offers higher power densities, and therefore faster scanning rates, over lasers, and is capable of processing superalloys. The powder is melted at the energy focus site on the build surface or substrate. The strategy of the scanning, power of the energy beam, residence time or speed, sequence of melting are directed by an embedded CAD system. The precursor powder is either gravitationally fed from cassettes or loaded by a piston so that it can be raked onto the build table. The excess powder is raked off and collected for re-application. Since the electron gun or laser is fixed, the build table can be lowered with each successive layer so that the work product is built upon the pre-solidified layer beneath.

Significant effort is needed to improve the speed of ALM processes so that they can become a cost effective option to castings, and to improve the quality because ALM produced work products suffer from several deficiencies resulting in poor material characteristics, such as porosity, melt ball formations, layer delamination, and uncontrolled surface coarseness and material compositions.

SUMMARY

A particle separator for an additive manufacturing system according to one, non-limiting embodiment of the present disclosure includes a housing for flow of a mixed powder having particles of variable weight, the housing having an inner wall, an outer wall, and a bend portion generally constructed by the inner and outer walls, and first and second offtake holes in the housing and disposed downstream of the bend portion with the first offtake hole located closer to the inner wall than the second offtake hole and the second offtake hole located closer to the outer wall than the first offtake hole.

In a further embodiment of the foregoing embodiment the first offtake hole receives particles having a lighter weight than particles received by the second offtake hole.

In the alternative or additionally thereto, in the foregoing embodiment, the flow area of the first offtake hole is smaller than the flow area of the second offtake hole and the first offtake hole receives smaller particles than the second offtake hole.

In the alternative or additionally thereto, in the foregoing embodiment, the particles have substantially equivalent densities.

In the alternative or additionally thereto, in the foregoing embodiment, the separator further includes a turning vane disposed inside the housing and between the inner and outer walls generally at the bend portion.

In the alternative or additionally thereto, in the foregoing embodiment, the separator further includes an air supply device constructed and arranged to entrain the mixed powder into an airflow flowing into the housing.

In the alternative or additionally thereto, in the foregoing embodiment, the air supply device is an air compressor located upstream of the housing.

In the alternative or additionally thereto, in the foregoing embodiment, the separator further includes a hopper located between the air compressor and the housing for dispensing the mixed powder into the airflow.

In the alternative or additionally thereto, in the foregoing embodiment, the separator further includes first and second conduits associated with the respective first and second offtake holes, and first and second control valves in the respective first and second conduits for controlling the flow of separated particles into a particle spreader.

In the alternative or additionally thereto, in the foregoing embodiment, the separator further includes a feed return hopper, and an outlet of the housing disposed downstream of the first and second offtake holes and communicating with the feed return hopper for receipt of particles not accepted by the first and second offtake holes.

In the alternative or additionally thereto, in the foregoing embodiment, the separator further includes a curved flow passage defined by the housing and including a longitudinal first passage portion defined in-part between the turning vane and the inner wall and a longitudinal second passage portion defined in-part between the turning vane and the outer wall, and wherein the first passage portion is shorter than the second passage portion when extrapolated along an upstream direction from the turning vane.

In the alternative or additionally thereto, in the foregoing embodiment, the separator further includes a second turning vane disposed between the turning vane and the outer wall, a third offtake hole disposed between the turning vane and the second turning vane, and a third passage portion of the curved flow passage defined in-part between the turning vane and the second turning vane and located between the first and second passage portions.

An additive manufacturing system according to another, non-limiting, embodiment includes a build table, a hopper, a particle separator constructed and arranged to receive mixed powder from the hopper, a spreader constructed and arranged to dispense separated particles of the mixed powder, and from the particle separator, onto the build table, and an energy gun constructed and arranged to melt the separated particles dispensed on the build table.

In a further embodiment of the foregoing embodiment, the system further includes an electric controller for controlling movement of the build table along at least a z-coordinate direction, controlling a dispensing movement of the spreader along an x-y coordinate plane, and controlling dispensing of specific separated particles from the particle separator and to the spreader.

In the alternative or additionally thereto, in the foregoing embodiment, the system further includes a roller constructed and arranged to roll across a powder bed placed upon the build table by the spreader.

In the alternative or additionally thereto, in the foregoing embodiment, the energy gun is a laser.

In the alternative or additionally thereto, in the foregoing embodiment, the energy gun is an electron beam gun.

A method of operating an additive manufacturing system according to another, non-limiting, embodiment includes the steps of entraining a mixed powder in an airflow, separating the mixed powder into first particles having a low pre-specified particle weight range and second particles having a high pre-specified particle weight range via a particle separator, separately controlling the flow of the respective first and second particles into a spreader, controllably dispensing the respective first and second particles onto a build table in a pre-specified pattern, and melting the pre-specified pattern with an energy gun.

In a further embodiment of the foregoing embodiment, the method includes the further steps of controlling material composition of a work product by varying the flow rates of the first and second particles depending on a specific location of the pre-specified pattern.

In the alternative or additionally thereto, in the foregoing embodiment, the method includes the further steps of controlling a surface roughness of a work product by varying the flow rates of the first and second particles.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
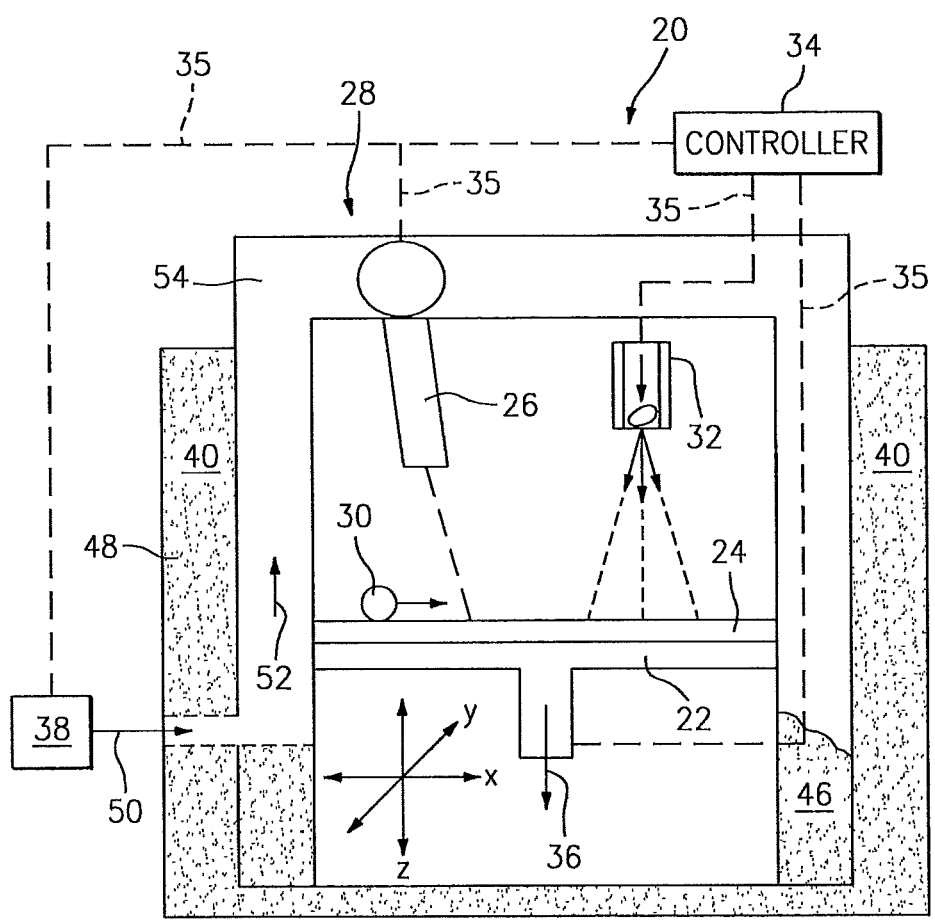
FIG. 1 is a schematic view of an additive manufacturing system according to one non-limiting embodiment of the present disclosure.

FIG. 1 schematically illustrates an additive manufacturing system 20 having a build table 22 for holding a powder bed 24, a particle spreader 26 for producing the powder bed 24, an aerodynamic particle separator 28 for controllably supplying separated particles to the spreader 26, a roller 30 for compressing the powder bed, an energy gun 32 for selectively melting regions of the powder bed, and a controller 34 for controlling the various operations of the components. The system 20 is constructed to build a work product (not shown) in a layer-by-layer process. The build table 22 is thus constructed to move along a substantially vertical z-coordinate, as generally illustrated by arrow 36. As each layer of the work product is formed, the build table 22 receives an electric signal 35 from the controller 34 and moves downward by a distance that is substantially equal to the height of the next layer. The powder bed 24 is generally formed or produced by the particle spreader or nozzle 26 for each layer. The spreader 26 may be a traversing X-Y coordinate gantry spreader. Generally, the powder bed 24 is formed across the entire build table 22 at a substantially consistent thickness with a powder composition that is dictated by the particle separator 28 that is controlled by the controller 34 through the electric signals 35, and feeds the spreader 26.

Figure 2:
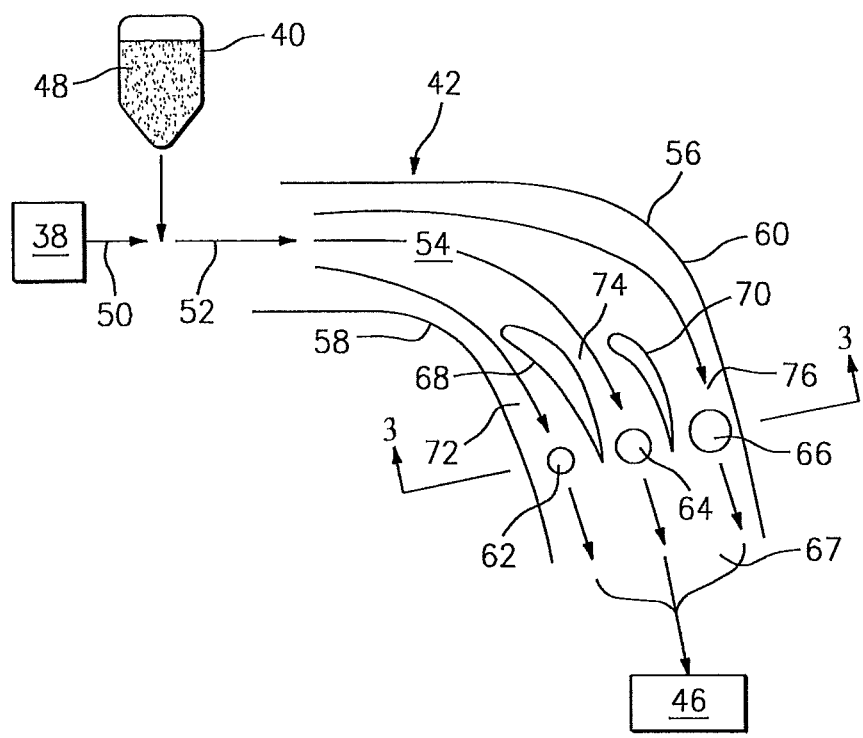
FIG. 2 is a schematic view of an aerodynamic particle separator of the additive manufacturing system.
Figure 3:
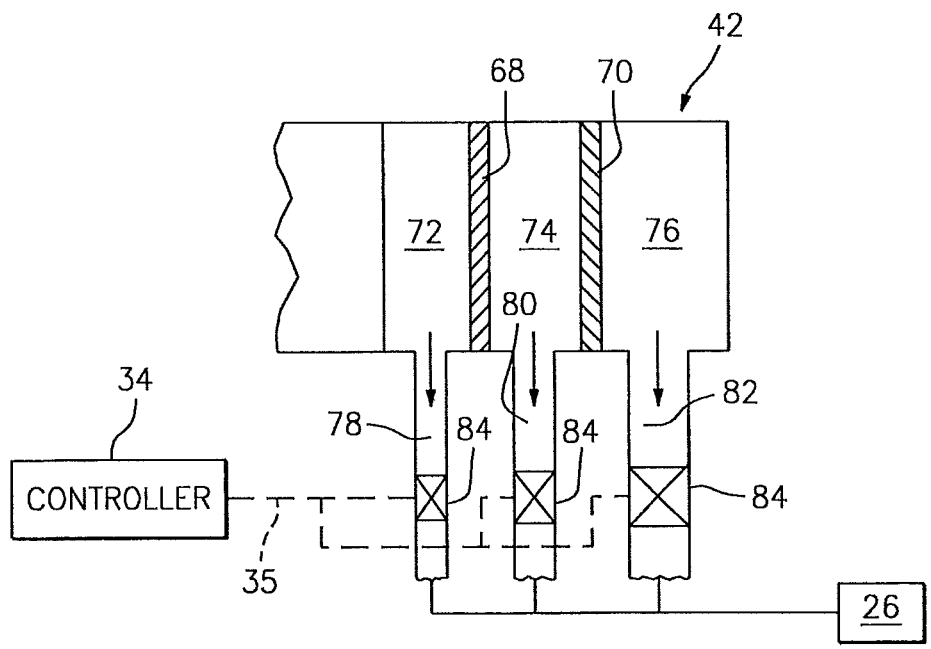
FIG. 3 is a cross section of the aerodynamic particle separator taken along line 3-3 of FIG. 2.

Referring to FIGS. 1 through 3, the aerodynamic particle separator 28 has an air supply device 38, a supply hopper 40, a housing 42, a plurality of offtake conduits 44 and a feed return hopper 46. The air supply device 38 may be an air compressor located in an upstream direction from the supply hopper 40. The hopper 40 contains a mixed powder 48 and is capable of feeding the powder 48 into an airstream (see arrow 50) produced by the air supply device 38. The combined air and powder mixture (see arrow 52) flows through a passage 54 defined by the housing 42. While in the housing 42, particles of the mixed powder 48 are generally divided by weight ranges thus producing particles grouped with low weight ranges to high weight ranges. It is understood and contemplated that the hopper 40 may be any means of supplying a mixed powder into the airflow and may include a piston actuated type device. It is further understood and contemplated that the air supply device 38 may be any device capable of pushing or pulling air through the housing 42 for suspending the powder in the airflow.

To accomplish this particle separation, the passage 54 is generally curved thus the housing 42 has a bend portion 56, an inner wall 58 and an outer wall 60. The inner and outer walls 58, 60 define in-part the passage 54, therebetween, and generally forms the cross sectional contour of the bend. Because the particles of the mixed powder 48 are entrained in the airstream 50, the particles of a heavier weight carry more momentum than the particles of a lighter weight and thus are carried across the airstream in the passage 54 and generally toward the outer wall 60 generally at the bend portion 56. The lighter particles are less apt to cross the airstream and may thus flow closer to the inner wall 58.

To capture this separation of particles, three offtake holes 62, 64, 66 communicate through the housing 42 and are spaced between the inner and outer walls 58, 60. Each hole 62, 64, 66 are generally located immediately downstream of the bend portion 56 with first hole 62 being locate near the inner wall 58, the second hole 66 located near the outer wall 60 and the third hole 64 located and spaced between the first and second holes 62, 66. Each offtake hole 62, 64, 66 is position to accept particles having specific weight ranges. For instance, the offtake hole 66 accepts particles falling within a heavy weight range, the hole 62 accepts particles falling within a light weight range and the hole 64 is positioned to accept particles having a weight range between the light and heavy weight ranges. Any particles not captured by the offtake holes 62, 64, 66 continue to travel through an outlet 67 of the housing 42 and into a feed return hopper 46.

The mixed powder 48 may be homogenous with different particle sizes or the mixed powder may include particles of different compositions and thus different particle densities. For homogeneous mixed powder, the particles may have about the same densities but different sizes thus different weights. For such homogeneous mixtures, the offtake holes 62, 64 66 may be sized to accept the varying size of the particles. That is, the hole 66 near the outer wall 60 may have the largest cross sectional flow area, the mid hole 64 has a medium cross section flow area, and the hole 62 near the inner wall has the smallest cross sectional flow area. For mixed powders 48 of a non-homogeneous composition (e.g. having different constituents to form an alloy), the holes 62, 64, 66 may have substantially equivalent cross sectional flow areas or may be sized such that specific amounts of a particle enter any one hole, or may be sized as described for the homogeneous mixed powder if the density differences between constituents is minimal relative to the size differences between constituents.

The particle separator 28 may further include first and second turning vanes 68, 70 locate in the passage 54, generally at the bend portion 56, and secured to the housing 42. The first vane 68 may be located between and slightly upstream from the first and second holes 62, 64 and with respect to streamlines of the airstream. Similarly, the second vane 70 may be located between and slightly upstream from the second and third holes 64, 66. The vanes 68, 70 generally divide the passage 54 into an inner passage portion 72, a mid passage portion 74, and an outer passage portion 76. The inner passage portion 72 is defined between the first vane 68 and the inner wall 58 and is generally extrapolated or extended upstream through the bend portion 56 and along streamlines. The outer passage portion 76 is defined between the second vane 70 and the outer wall 60 and is generally extrapolated or extended upstream through the bend portion 56 and along streamlines. The mid passage portion 74 is generally defined between the vanes 68, 70 and is generally extrapolated or extended in an upstream direction through the bend portion 56 and along streamlines between the inner and outer passage portions 72, 76. Each passage portion 72, 74, 76 communicate with respective offtake holes 62, 64, 66.

The vanes 68, 70 may have different turning rates that impact flow field velocities used to induce pressure fields to migrate the particles and thus assist in sorting the particles by promoting the larger and/or heavier particles, with associated momentums, to cross the streamlines of the airstream to the farthest or outer passage portion 76 in the bend. The smallest and/or lighter particles flow in-line with the streamlines and take the inside path or inner passage portion 72 through the separator 28.

Each offtake hole 62, 64, 66 is associated with an offtake conduit 78, 80, 82 orientated substantially perpendicular to the passage 54. A control valve 84 is located in each conduit 78, 80, 82, and may be electromechanical receiving electric signals 35 from the controller 34. The valves 84 move between open and closed positions thus establishing a controlled rate of delivery of each size range and/or weight of particles to the spreader 26. The spreader 26 then remixes the particles from the conduits 78, 80, 82 and distributes the particles onto the build table 22. It is understood and contemplated that although the spreader 26 is illustrated as part of an ALM process, the spreader 26 and particle separator 28 may also be applied to a laser deposition process or similar processes.

In one example the mixed powder 48 particles sizes may range from about 10 microns to about 60 microns with a nominal size of about 40 microns. The thickness of the powder bed 24 may range from about 20 microns to about 100 microns. The mixed powder 48 may contain the constituents of Molybdenum, Silicon and Boron. The Molybdenum has the largest particles with the next higher size being Silicon and the finest being Boron.

Figure 4:
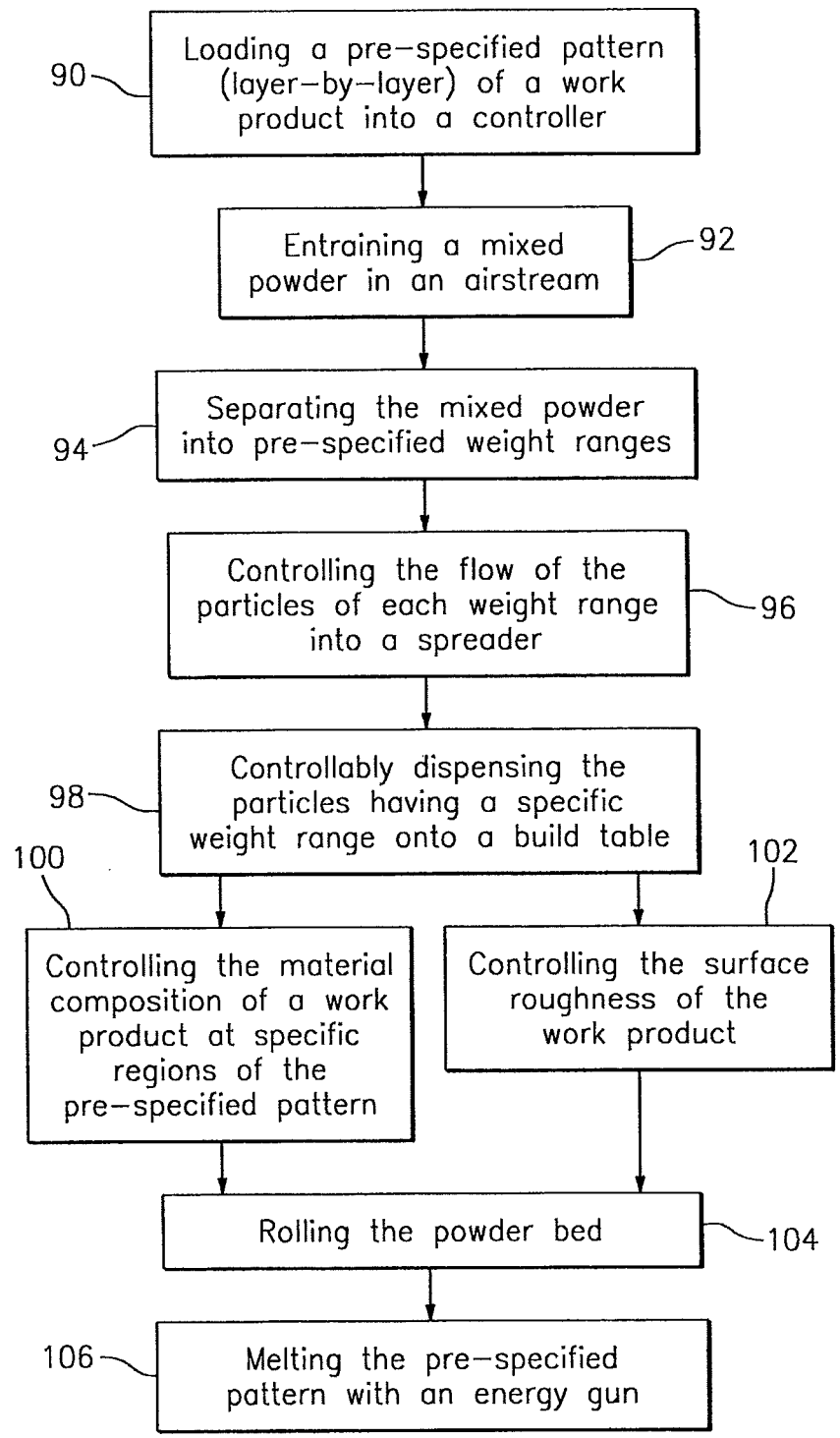
FIG. 4 is a flow chart of a method of operating the additive manufacturing system.

Referring to FIG. 4 and as a first step 90 of operation, a three-dimensional geometry of a work product may be designed in a Computer Aided Design (CAD) software system of, or loaded into, the controller 34. This design includes pre-specified patterns of the work product on a layer-by-layer basis such that surface roughness can be controlled (i.e. smaller particles deposited at surface locations for smoother surfaces, larger particles for greater porosity, and/or varying constituent percentages for varying alloy compositions). To fabricate the work product and as a next step 92, the mixed powder 48 is fed from the hopper 40 and into an airstream 50 produced by the air supply device 38 and per electric signals 35 received from the controller 34. The air-and-powder mixture 52 travels through the housing 42 upstream of the bend portion 56 and turning vanes 68, 70. As the mixed powder 48 travels through the passage 54, a momentum is imparted to each particle in the powder. The heavier the weight of the particle the greater the momentum.

The heavier particles with the greater momentum are capable of crossing streamlines of the airstream generally at the bend portion 56 of the housing 42. The feed rate of the mixed powder 48, the airstream flow rate or velocity, the turning vane angles and the offtake hole cross section flow areas are all pre-set structurally and/or through the electric signals 35 of the controller 34 to meet pre-specified particle weight or size ranges that enter the respective offtake holes 62, 64, 66. As a next step 94, the mixed powder 48 is thus separated into weight and/or size ranges of particles with the heavier particles being entrained in the outer or longer passage portion 76, the medium particle ranges in the mid passage portion 74 and the lighter or smaller ranges in the inner or shorter passage portion 72.

The next step 96, controls the flow of the particles of each weight range to the spreader 26. This is done through the control valves 84 in each conduit 78, 80, 82 and electric signals 35 received from the controller 34. If more of a particular constituent for any one region of the pre-specified, layered, pattern is desired, the control valve 84 associated with that constituent moves further toward the open position, and vice versa. As step 98, the spreader 26 then spreads the pre-specified constituents of the mixed powder onto the build table 22. In this way and as a step 100, the alloy composition of the work product can be controlled and varied from one specific region of the work product to the next. Moreover and as step 102, the surface roughness of the work product can be varied by dispensing smaller particles for smoother surfaces and larger particles for rougher surfaces.

The next step 104 involves rolling the powder bed 24 with the roller 30 to achieve a consistent layer density and thickness of the bed and thereby control excessive porosity of the work product. Once rolled and as step 106, the powder at the pre-specified pattern is melted with the energy gun 32. The pattern then solidifies, the bed table 36 is lowered in the z-coordinate direction 36 and the process generally repeats itself for the fabrication of the next layer of the work product.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A particle separator for an additive manufacturing system comprising:
   a housing for flow of a mixed powder having particles of variable weight, the housing having an inner wall, an outer wall, and a bend portion generally constructed by the inner and outer walls; and
   first and second offtake holes in the housing and disposed downstream of the bend portion with the first offtake hole located closer to the inner wall than the second offtake hole and the second offtake hole located closer to the outer wall than the first offtake hole.

2. The particle separator set forth in claim 1 wherein the first offtake hole receives particles having a lighter weight than particles received by the second offtake hole.

3. The particle separator set forth in claim 2 wherein the flow area of the first offtake hole is smaller than the flow area of the second offtake hole and the first offtake hole receives smaller particles than the second offtake hole.

4. The particle separator set forth in claim 3 wherein the particles have substantially equivalent densities.

5. The particle separator set forth in claim 2 further comprising:
   a turning vane disposed inside the housing and between the inner and outer walls generally at the bend portion.

6. The particle separator set forth in claim 2 further comprising:
   an air supply device constructed and arranged to entrain the mixed powder into an airflow flowing into the housing.

7. The particle separator set forth in claim 6 wherein the air supply device is an air compressor located upstream of the housing.

8. The particle separator set forth in claim 7 further comprising:
   a hopper located between the air compressor and the housing for dispensing the mixed powder into the airflow.

9. The particle separator set forth in claim 2 further comprising:
   first and second conduits associated with the respective first and second offtake holes; and
   first and second control valves in the respective first and second conduits for controlling the flow of separated particles into a particle spreader.

10. The particle separator set forth in claim 5 further comprising:
    a feed return hopper; and
    an outlet of the housing disposed downstream of the first and second offtake holes and communicating with the feed return hopper for receipt of particles not accepted by the first and second offtake holes.

11. The particle separator set forth in claim 5 further comprising:
    a curved flow passage defined by the housing and including a longitudinal first passage portion defined in-part between the turning vane and the inner wall and a longitudinal second passage portion defined in-part between the turning vane and the outer wall; and
    wherein the first passage portion is shorter than the second passage portion when extrapolated along an upstream direction from the turning vane.

12. The particle separator set forth in claim 11 further comprising:
    a second turning vane disposed between the turning vane and the outer wall;
    a third offtake hole disposed between the turning vane and the second turning vane; and
    a third passage portion of the curved flow passage defined in-part between the turning vane and the second turning vane and located between the first and second passage portions.

13. An additive manufacturing system comprising:
    a build table;
    a hopper;
    a particle separator constructed and arranged to receive mixed powder from the hopper;
    a spreader constructed and arranged to dispense separated particles of the mixed powder, and from the particle separator, onto the build table;
    an energy gun constructed and arranged to melt the separated particles dispensed on the build table, and
    an electric controller for controlling movement of the build table along at least a z-coordinate direction, controlling a dispensing movement of the spreader along an x-y coordinate plane, and controlling dispensing of specific separated particles from the particle separator and to the spreader.

14. The additive manufacturing system set forth in claim 13 further comprising:
    a roller constructed and arranged to roll across a powder bed placed upon the build table by the spreader.

15. The additive manufacturing system set forth in claim 13 wherein the energy gun is a laser.

16. The additive manufacturing system set forth in claim 13 wherein the energy gun is an electron beam gun.

17. A method of operating an additive manufacturing system comprising the steps of:
    entraining a mixed powder in an airflow;
    separating the mixed powder into first particles having a low pre-specified particle weight range and second particles having a high pre-specified particle weight range via an aerodynamic particle separator;
    separately controlling the flow of the respective first and second particles into a spreader;
    controllably dispensing the respective first and second particles onto a build table in a pre-specified pattern; and
    melting the pre-specified pattern with an energy gun.

18. The method of operating the additive manufacturing system set forth in claim 17 comprising the further step of:
controlling material composition of a work product by varying the flow rates of the first and second particles depending on a specific location of the pre-specified pattern.

19. The method of operating the additive manufacturing system set forth in claim 17 comprising the further step of:
controlling a surface roughness of a work product by varying the flow rates of the first and second particles.

* * * * *